United States Patent Office 3,265,705
Patented August 9, 1966

3,265,705
METAL COMPLEXES OF PYRAZOLE-HALOKE-
TONES AND PREPARATION THEREOF
Walter Mahler, Wilmington, Del., assignor to E. I. du
Pont de Nemours and Company, Wilmington, Del., a
corporation of Delaware
No Drawing. Filed June 9, 1965, Ser. No. 462,721
11 Claims. (Cl. 260—299)

This invention relates to a new class of organo-inorganic coordination compounds and a process for their preparation. More particularly, the invention relates to chelate complexes of pyrazole, haloalkylketones, and selected metals.

The compounds of this invention may be represented by the general formula

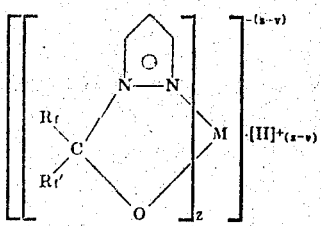

wherein $R_f$ and $R_f'$ each are selected from the group consisting of perhaloalkyl and ω-hydroperhaloalkyl, each having 1–6 carbon atoms; $R_f$ and $R_f'$ taken together are perhaloalkylene having 3–6 carbon atoms; M is a metallic element of a B group of the Periodic Chart of the Elements, such as set forth in "The Handbook of Chemistry and Physics," 31st edition, 1959, pages 448–9, and more particularly, M is an element having an atomic number within one of the ranges 21–30, 39–48, 57–80 and 90–94, the latter range being determined by the availability of the element, with the proviso that when the element has an atomic number of 74 or 92, it is in the form of its oxide $WO_2$ or $UO_2$, respectively; z is one-half the coordination number of M; v is the valence state of M and is 1–4, preferably 1–3; and (z−v) is 0 or 1. In the formula as shown the circle within the pyrazole nucleus represents all the resonant forms of this structure. This resonance stabilization is believed to account for or at least enhance the stability of the complexes. Although the coordination numbers of the metals operable herein vary from 2–8, most frequently the coordination numbers are the even numbers within this range, and especially the even numbers 4 and 6. Hence, z in the aforesaid formula generally will be 1–4, with 2–3 being preferable. In the preferred complexes M is an element having an atomic number lying within one of the ranges 21–30 and 39–46, and especially 26–30, and the halogens in $R_f$ and $R_f'$ are fluorine or chlorine. More preferably, each $R_f$ and $R_f'$ should contain at least one fluorine atom, and $R_f$ and $R_f'$ taken together should contain at least two fluorine atoms. Of highest preferability are the aforesaid $R_f$ and $R_f'$ groups which contain at least double this number of fluorine atoms.

The novel complexes of this invention are prepared by the reaction of a metal pyrazolide with a di(haloalkyl) or haloalkylene ketone. The ketone may be employed as the free ketone or as one of its solvates, such as a hydrate or an alcoholate. The reaction by which the complexes are prepared may be represented by the following simplified equation $$M(C_3H_3N_2)_z + z(R_fR_f'CO) \rightarrow M(C_3H_3N_2R_fR_f'CO)_z$$

In this equation $C_3H_3N_2$ represents the pyrazolide nucleus and the other terms are as defined above.

In carrying out the preparative reaction temperatures in the range of 0 to 200° C. are employed, with a temperature range of about 25° C. to about 110° C. being preferred. The pressure is not critical in the reaction and subatmospheric as well as superatmospheric pressures may be utilized in addition to atmospheric pressure. Thus, pressures of 1 mm. of mercury to 50 atmospheres are operable herein. At pressures below or above atmospheric pressure, however, it is desirable to operate in a closed system to prevent loss of reactants. Although a solvent or inert diluent may be employed, the reaction may equally well be carried out in the presence of the necessary reactants without added diluents. The molar ratio of metal pyrazolide to ketone may be varied widely, for example, between molar ratios of about 1:20 to about 20:1. Generally, the reactants are employed in approximately stoichiometric quantities, although when it is desirable to ensure maintenance of a liquid reaction medium, a slight molar excess of the ketone is introduced into the reaction mixture.

The metal pyrazolides which are employed as reactants herein are prepared by contacting and reacting a solution of the appropriate metal salt with pyrazole in the presence of a base. Alternately, the metal pyrazolide may be produced by first contacting pyrazole with an alkali metal and subsequently reacting the thus formed alkali metal pyrazolide with the appropriate metal salt. The metal pyrazolide may be prepared independently and utilized herein or it may be prepared in situ just prior to the addition of the haloalkylketone.

In the general formula representing the chelate complexes of this invention it may be seen that the complex may be protonated, i.e., when (z−v) is 1, in which case the expression −(z−v) indicates that the portion of the complex shown within the outer brackets has a negative charge. The source of the proton generally is the pyrazole reactant, in which case the pyrazolide nucleus enters the chelate complex along with an additional molecule of haloalkylketone. This more complicated type of reaction, which probably occurs to enable the metal to achieve a more stable coordination number, may be represented by the equation

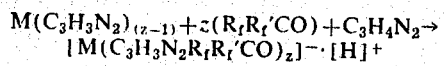
$$M(C_3H_3N_2)_{(z-1)} + z(R_fR_f'CO) + C_3H_4N_2 \rightarrow [M(C_3H_3N_2R_fR_f'CO)_z]^- \cdot [H]^+$$

Although it is not fully understood how the proton is bonded to the complex, it is believed that the proton is associated with one of the electron rich atoms and probably the oxygen atom. It also has been discovered that the bonding of the proton within the complex is such that it is not usually susceptible to replacement by other cations.

In addition to the aforesaid protonation of the complexes it has been noted that the compounds of this invention may be solvated with a conventional solvating agent such as water, an alcohol, ammonia and the like, as well as the pyrazole or the haloalkyl ketone utilized as a reactant.

The following examples are intended to illustrate, but not limit, the present invention. In the examples parts are by weight.

*Example 1.—Ferric tris(pyrazolide-hexafluoroacetone)*

Fifty parts of pyrazole is heated until molten (70° C.) and five parts of sodium metal is added in small portions. Ten parts of anhydrous ferric chloride is added with stirring. The reaction mixture is cooled and washed with methanol. The insoluble portion is contacted with 30 parts of hexafluoroacetone·1.5H₂O. This mixture is filtered and the filtrate diluted with water to give a precipitate which is sublimed in vacuum at 150° C. The sublimate is crystallized from benzene to give 5 parts of very pale green needles, M.P. 231° C. The analysis corresponds to Fe(pyrazolide-hexafluoroacetone)₃.

*Analysis.*—Calcd. for $C_{18}H_9F_{18}N_6O_3Fe$: C, 28.62; H, 9; F, 45.31; N, 11.13; Fe, 7.40. Found: C, 28.65; 1.29; F, 45.57; N, 12.23; Fe, 7.37.

*Example 2.*—[*Nickel tris(pyrazolide-hexafluoroacetone)*]$^-$·H$^+$·H$_2$O

Six parts of nickel bispyrazolide·H$_2$O is stirred with parts of hexafluoroacetone·1.5H$_2$O. The green soion is filtered. The filtrate is evaporated in a stream nitrogen and the resulting green solid recrystallized from hot toluene to give 14 parts of fine green needles, .P. 143° C. The analysis corresponds to [nickel(pyrazdehexafluoroacetone)$_3$]$^-$·H$^+$·H$_2$O.

*Analysis.*—Calcd. for $C_{18}H_{12}F_{18}N_6O_4Ni$: C, 27.84; H, 55; F, 44.08; N, 10.83; Ni, 7.57. Found: C, 28.04; 1.52; F, 42.82; N, 10.44; Ni, 7.60.

*ample 3.*—[*Nickel tris(pyrazolide-dichlorotetrafluoroacetone)*]$^-$·H$^+$·H$_2$O Ten parts of nickel(pyrazolide)$_2$ is contacted with 30 rts dichlorotetrafluoroacetone·H$_2$O. The solid goes to solution and is precipitated by adding 100 parts H$_2$O d isolated by filtration. This is taken up in 50 parts hot benzene, cooled, and reprecipitated with 300 parts troleum ether. The resulting green crystals melt at 0° C. and have a composition corresponding to [Nirazolide-dichlorotetrafluoroacetone)$_3$]$^-$·H$^+$·H$_2$O.

*Analysis.*—Calcd. for $C_{18}H_{12}Cl_6F_{12}N_6O_4Ni$: F, 26.04; , 24.31; Ni, 6.71. Found: F, 25.88; Cl, 23.87; Ni, 49.

*xample 4.*—Copper bis(pyrazolide-hexafluoroacetone)

*Part A.*—Fifteen parts of cupric bispyrazolide·NH$_3$ is rred with 25 parts of hexafluoroacetone·1.5H$_2$O for 30 inutes. The resulting solution is poured into 1000 parts water to give 38 parts of Cu(pyrazolide-hexafluoroacene)$_2$. This product is purified by subliming at 70° C. id recrystallizing from benzene; M.P. 157–160° C. ealed tube).

*Analysis.*—Calcd. for $C_{12}H_6F_{12}N_4O_2Cu$: C, 27.21; H, 13; F, 43.10; N, 10.58; Cu, 12.01. Found: C, 27.68; , 1.38; F, 43.36; N, 10.65; Cu, 12.05.

*Part B.*—Four parts of cupric bispyrazolide is combined th eight parts of gaseous hexafluoroacetone in a sealed be and kept at 100° C. for four hours. On cooling, I parts of Cu(pyrazolide-hexafluoroacetone)$_2$ is obtained blue crystals, M.P. 160° C., having the same infrared ittern as the product obtained in Part A.

*xample 5.*—Copper bis(pyrazolide-dichlorotetrafluoroacetone)·dichlorotetrafluoroacetone Ten parts of cupric bispyrazolide is contacted with 50 irts of dichlorotetrafluoroacetone, (CClF$_2$)$_2$CO, at 25° . This gives a blue solution which is allowed to stand r two days to allow excess ketone to evaporate. The sulting blue crystals melt at 128° C. and have the com)sition Cu(pyrazolide-dichlorotetrafluoroacetone)$_2$·dilorotetrafluoroacetone.

*Analysis.*—Calcd. for $C_{15}Cl_6H_6F_{12}N_4O_3Cu$: C, 22.65; , 0.76; F, 28.70; N, 7.05; Cl, 25.78; Cu, 7.99. Found: 21.68; H, 1.23; F, 28.65; N, 7.37; Cl, 26.10; Cu, 7.52.

*xample 6.*—Copper bis(pyrazolide-tetrachlorodifluoroacetone)

Ten parts of cupric bispyrazolide is mixed with 30 parts tetrachlorodifluoroacetone, (CCl$_2$F)CO, at 25° C. ter 30 minutes, the mixture is taken up in 150 parts of irm benzene and filtered. The filtrate is concentrated d the 22 parts of blue crystals collected have a melting int of 141° C. and correspond to Cu(pyrazolide-tetralorodifluoroacetone)$_2$.

*Analysis.*—Calcd. for $C_{12}Cl_8H_6F_4N_4O_2Cu$: Cu, 9.6. iund: Cu, 9.70.

*Example 7.*—Copper bis(pyrazolide-chloropentafluoroacetone)

Five parts of cupric bispyrazolide is mixed with 20 parts of chloropentafluoroacetone, CF$_3$COCClF$_2$, and heated to 100° C. for 30 minutes. The resulting blue solid is dissolved in 100 parts of warm benzene, filtered, and the filtrate is concentrated to give 12 parts of blue crystals that have a melting point of 136° C. The composition corresponds to Cu(pyrazolide-chloropentafluoroacetone)$_2$.

*Analysis.*—Calcd. for $C_{12}Cl_2H_6F_{10}N_4O_2Cu$: Cu, 11.3. Found: Cu, 11.06.

*Example 8.*—Copper bis(pyrazolide-trichlorotrifluoroacetone)

Ten parts of cupric bispyrazolide is contacted with 30 parts of trichlorotrifluoroacetone, CF$_2$ClCOCFCl$_2$, for 30 minutes. The product is dissolved in 150 parts of warm benzene, filtered, and the filtrate is concentrated to give 20 parts of blue crystals of copper (pyrazolide-trichlorotrifluoroacetone)$_2$, M.P. 139° C., having a composition corresponding to $C_{12}Cl_6H_6F_6N_4O_2Cu$.

*Analysis.*—Calcd.: Cu, 10.13. Found: Cu, 10.13.

*Example 9.*—Copper bis(pyrazolide-hexafluorocyclobutanone)

Two parts of cupric bispyrazolide is contacted with six parts of hexafluorocyclobutanone in a closed cylinder at 100° C. for one hour. The tube is opened, unreacted hexafluorocyclobutanone is vented, and blue crystals, M.P. 186° C., are recovered and found to be cupric bis-(pyrazolide-hexafluorocyclobutanone).

*Analysis.*—Calcd. for $C_{14}H_6F_{12}N_4O_2Cu$: C, 30.38; H, 1.09; F, 41.23; N, 10.12; Cu, 11.47. Found: C, 30.49; H, 1.34; F, 41.92; N, 9.56; Cu, 10.82.

*Example 10.*—Zinc tris(pyrazolide-hexafluoroacetone)]$^-$·H$^+$

Twenty parts of Zn(pyrazolide)$_2$ is dissolved in 50 parts of warm (70° C.) hexafluoroacetone·1.5H$_2$O. On standing two hours white crystals deposit, M.P. 105° C.; the analysis corresponds to [Zn(pyrazolide-hexafluoroacetone)$_3$]$^-$·H$^+$.

*Analysis.*—Calcd. for $C_{18}H_{10}F_{18}N_6O_3Zn$: C, 28.26; H, 2.00; F, 44.73; N, 10.98; Zn, 8.56. Found: C, 28.54; H, 1.81; F, 43.37; N, 12.42; Zn, 8.32.

*Example 11.*—Silver pyrazolide-hexafluoroacetone

Fifteen parts of silver pyrazolide is contacted with 60 parts of hexafluoroacetone·1.5H$_2$O. All the solid dissolves; from the solution on cooling is recovered Ag(pyrazolide-hexafluoroacetone). This chelate complex, as is the gold analogue, is of limited stability.

*Example 12.*—Cobalt tris(pyrazolide-hexafluoroacetone)

To 10 parts of CoCl$_2$ as a solution in aqueous ammonia is added a solution of 20 parts of pyrazole in aqueous ammonia. This gives a purple precipitate which is isolated by filtering under nitrogen. This solid is contacted with 25 parts of hexafluoroacetone·1.5H$_2$O. The liquid material is filtered off and the solid product extracted with benzene and recrystallized to give 8 parts of Co(pyrazolide-hexafluoroacetone)$_3$, M.P. 112° C. During the course of this experiment the cobalt has been oxidized from a valence state of two to a valence state of three.

*Analysis.*—Calcd. for $C_{18}H_9F_{18}N_6O_3Co$: C, 28.50; H, 1.19; F, 45.12; N, 11.08; Co, 7.78. Found: C, 28.05; H, 1.52; F, 42.82; N, 10.44; Co, 7.60.

*Example 13.*—Thorium tetrakis(pyrazolide-hexafluoroacetone)

Ten parts of thorium nitrate is dissolved in 100 parts of H$_2$O to which is added 30 parts of pyrazole in 100 parts of H$_2$O. To this solution is added aqueous ammonia to give a white precipitate which is isolated by filtration and treated with 20 parts of hexafluoroacetone·CH$_3$OH. Excess reagent is evaporated on a steam bath with a stream of nitrogen in two hours. The remainder is extracted with hot benzene and filtered. The filtrate is taken to dryness on a steam bath to give Th(pyrazolide-hexafluoroacetone)$_4$ in the form of a white solid which sublimes at 180° C. and melts at 242° C.

*Analysis.*—Calcd. for C$_{24}$H$_{12}$F$_{24}$N$_8$O$_4$Th: C, 24.74; H, 1.03; F, 39.18; N, 9.62; Th, 19.95. Found: C, 25.02; H, 1.38; F, 38.91; N, 9.62; Th, 20.39.

*Example 14.*—[Europium tetrakis(pyrazolide-hexafluoroacetone)]$^-$·H$^+$·pyrazole To 20 parts of liquid pyrazole (70° C.) is added six parts of potassium metal in small portions. The mixture is allowed to cool and 10 parts of anhydrous EuCl$_3$ is stirred into the solid after which 50 parts of methanol is added and the mixture is filtered. The solid is extracted with hexafluoroacetone·CH$_3$OH. On dilution of the filtrate with 100 parts of water, a white precipitate forms which, after recrystallization from cyclohexane, has an M.P. of 145–150° C. The solid as well as solutions thereof in hexane or benzene exhibit red fluorescence under ultraviolet light. The composition corresponds to [Eu(pyrazolide-hexafluoroacetone)$_4$]$^-$·H$^+$·pyrazole.

*Analysis.*—Calcd. for C$_{27}$H$_{17}$F$_{24}$N$_{10}$O$_4$Eu: C, 28.12; H, 1.39; N, 12.15; Eu, 13.19. Found: C, 28.96; H, 1.77; N, 12.55; Eu, 12.57.

*Example 15.*—Uranyl bis(pyrazolide-hexafluoroacetone)·hexafluoroacetone·NH$_3$

Ten parts of uranyl acetate is dissolved in 100 parts of water and added to a solution of twenty parts pyrazole in 200 parts of aqueous ammonia. The resulting yellow precipitate is contacted with 30 parts hexafluoroacetone·methanol at 25° C. for two hours. The excess hexafluoroacetone·methanol is evaporated in a stream of nitrogen and the remaining solid extracted with benzene in a Soxhlet apparatus. In this way 5 parts of yellow crystals is obtained with a composition corresponding to UO$_2$(pyrazolidehexafluoroacetone)$_2$·hexafluoroacetone·NH$_3$

*Analysis.*—Calcd. for C$_{15}$H$_9$F$_{18}$N$_5$O$_5$U: C, 19.57; H, 1.0; F, 37.18; N, 7.61; U, 25.88. Found: C, 19.83; H, 1.52; F, 36.77; N, 8.10; U, 26.93.

Further examples of the process and products of this invention are summarized in Table I. When the fluoroketone or metal salt indicated in column 1 is substituted for the corresponding reactant in column 2 in the procedure of the example indicated in column 3, the product shown in column 4 is obtained. In this table Pz is used as an abbreviation of "pyrazolide."

TABLE I

| Item | Fluoroketone or Metal Salt | Used in Place of | In Procedure of Example | Chelate Product |
|---|---|---|---|---|
| 16 | CF$_3$COCF$_2$Cl·2H$_2$O | (CF$_3$)$_2$CO·1.5H$_2$O | 1 | Fe(Pz-CF$_3$COCF$_2$Cl)$_3$ |
| 17 | CF$_3$COC$_2$F$_5$·H$_2$O | (CF$_3$)$_2$CO·1.5H$_2$O | 1 | Fe(Pz-CF$_3$COC$_2$F$_5$)$_3$ |
| 18 | (C$_2$F$_5$)$_2$CO·H$_2$O | (CF$_3$)$_2$CO·1.5H$_2$O | 1 | Fe(Pz-C$_2$F$_5$COC$_2$F$_5$)$_3$ |
| 19 | $\overline{CF_2CF_2COCF_2CF_2}$·H$_2$O | (CF$_3$)$_2$CO·1.5H$_2$O | 1 | Fe(Pz-$\overline{CF_2CF_2COCF_2CF_2}$)$_3$ |
| 20 | CF$_2$ClOCOCFCl$_2$ | (CF$_3$)$_2$CO·1.5H$_2$O | 1 | Fe(Pz-CF$_2$ClCOCFCl$_2$)$_3$ |
| 21 | C$_4$F$_9$COCF$_3$ | (CF$_3$)$_2$CO·1.5H$_2$O | 1 | Fe(Pz-C$_4$F$_9$COCF$_3$)$_3$ |
| 22 | (C$_2$F$_5$)$_2$CO·H$_2$O | (CF$_3$)$_2$CO·1.5H$_2$O | 2 | [Ni{Pz-(C$_2$F$_5$)$_2$CO}$_3$]$^-$·H$^+$·H$_2$O |
| 23 | C$_4$F$_9$COCF$_3$ | (CF$_3$)$_2$CO·1.5H$_2$O | 4 | Cu(Pz-C$_4$F$_9$COCF$_3$)$_2$ |
| 24 | (HC$_4$F$_8$)$_2$CO | (CF$_3$)$_2$CO·1.5H$_2$O | 4 | Cu(Pz-(HC$_4$F$_8$)$_2$CO)$_2$ |
| 25 | (HC$_4$F$_8$)$_2$CO | (CF$_3$)$_2$CO·1.5H$_2$O | 10 | [Zn(Pz-(HC$_4$F$_8$)$_2$CO)$_3$]$^-$·H$^+$ |
| 26 | (C$_2$F$_5$)$_2$CO | (CF$_3$)$_2$CO·CH$_3$OH | 13 | Th(Pz-(C$_2$F$_5$)$_2$CO)$_4$ |
| 27 | CF$_2$ClCOCFCl$_2$ | (CF$_3$)$_2$CO·CH$_3$OH | 13 | Th(Pz-CF$_2$ClCOCFCl$_2$)$_4$ |
| 28 | C$_4$F$_9$COCF$_3$ | (CF$_3$)$_2$CO·CH$_3$OH | 13 | Th(Pz-C$_4$F$_9$COCF$_3$)$_4$ |
| 29 | $\overline{CF_2CF_2COCF_2CF_2}$ | (CF$_3$)$_2$CO·CH$_3$OH | 13 | Th(Pz-$\overline{CF_2CF_2COCF_2CF_2}$)$_4$ |
| 30 | $\overline{CF_2CF_2COCF_2CF_2}$ | (CF$_3$)$_2$CO·CH$_3$OH | 14 | [Eu(Pz-$\overline{CF_2CF_2COCF_2CF_2}$)$_4$]$^-$·H$^+$·pyrazole |
| 31 | C$_4$F$_9$COC$_4$F$_9$ | (CF$_3$)$_2$CO·CH$_3$OH | 14 | Eu(Pz-C$_4$F$_9$COC$_4$F$_9$)$_3$ |
| 32 | ScCl$_3$ | FeCl$_3$ | 1 | Sc(Pz-CF$_3$COCF$_3$)$_3$ |
| 33 | PdCl$_2$ | FeCl$_3$ | 1 | Pd(Pz-CF$_3$COCF$_3$)$_2$ |
| 34 | MoCl$_3$ | FeCl$_3$ | 1 | Mo(Pz-(CF$_3$COCF$_3$)$_3$ |
| 35 | CeCl$_3$·7H$_2$O | Th(NO$_3$)$_4$ | 13 | Ce(Pz-(CF$_3$COCF$_3$)$_3$ |
| 36 | O$_2$WCl$_2$ | FeCl$_3$ | 1 | O$_2$W(Pz-CF$_3$COCF$_3$)$_2$ |
| 37 | K$_2$PtCl$_4$ | Th(NO$_3$)$_4$ | 13 | Pt(Pz-CF$_3$COCF$_3$)$_2$ |
| 38 | HgCl$_2$ | FeCl$_3$ | 1 | Hg(Pz-CF$_3$COCF$_3$)$_2$ |

The pyrazolide-haloalkylketone-metal complexes of this invention are especially useful as antistatic agents for polymeric materials, and particularly polyamides. For example, by incorporating a small quantity, such as 2–3 weight percent, of one of these complexes into nylon yarn, the electrical conductivity of the yarn is increased more than a thousandfold. The following example utilizing a commercially available 66 nylon (from hexamethylene diamine and adipic acid) demonstrates this utility.

*Example A*

Two parts of cupric bis(pyrazolide-hexafluoroacetone) is blended with 100 parts nylon 66 at 283° C. (melt) for 30 minutes. The blend is spun and the yarns drawn and the resistivity measured to be 10$^{12.8}$ ohms. The unmodified nylon 66 has a resistivity of 10$^{16}$ ohms. For comparison, cotton, which is considered to be acceptable, has a value of 10$^{13.3}$ ohms.

*Example B*

Example A is repeated with zinc tris(pyrazolide-hexafluoroacetone) being employed in place of the copper complex. The nylon yarn produced has a resistivity of 10$^{13.5}$ ohms.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. The class of chelate complexes having the formula

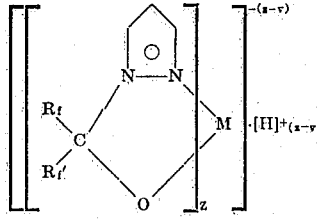

wherein $R_f$ and $R_f'$ each has 1-6 carbon atoms and is selected from the group consisting of perhaloalkyl and ω-hydroperhaloalkyl; $R_f$ and $R_f'$ taken together are perhaloalkylene having 3-6 carbon atoms; M is an element having an atomic number within one of the ranges 21-30, 39-48, 57-80 and 90-94, with the provisos that when the element has an atomic number of 74, it is in the form $WO_2$, and when the element has an atomic number of 92, it is in the form $UO_2$; z is one-half the coordination number of M and is an integer from 1-4; v is the valence state of M and is an integer from 1-4; and (z—v) is an integer from 0 to 1.

2. The chelate complexes of claim 1 wherein $R_f$ and $R_f'$ each are per(chlorofluoro)alkyl, M is an element having an atomic number within the range 26-30, z is 2-3 and v is 1-3.

3. The chelate complexes of claim 1 wherein $R_f$ and $R_f'$ each are perfluoroalkyl, M is an element having an atomic number within the range 26-30, z is 2-3 and v is 1-3.

4. The chelate complexes of claim 1 wherein $R_f$ and $R_f'$ each are ω-hydroperfluoroalkyl, M is an element having an atomic number within the range 26-30, z is 2-3 and v is 1-3.

5. The chelate complexes of claim 1 wherein $R_f$ and $R_f'$ taken together are perfluoroalkylene having 3-6 carbon atoms, M is an element having an atomic number within the range 26-30, z is 2-3 and v is 1-3.

6. Copper bis(pyrazolide-hexafluoroacetone).

7. [Zinc tris(pyrazolide-hexafluoroacetone)]$^-\cdot H^+$.

8. Ferric tris(pyrazolide-hexafluoroacetone).

9. [Nickel tris(pyrazolide-hexafluoroacetone)]$^-\cdot H^+$.

10. Cobalt tris(pyrazolide-hexafluoroacetone).

11. The process for preparing the chelate complexes of claim 1 which comprises the steps of contacting and reacting a metal pyrazolide $M(C_3H_3N_2)_z$ with a ketone $R_fCOR_f'$, with M, $R_f$, $R_f'$ and z being as defined in claim 1, at a temperature of 0-200° C., with the molar ratio of said pyrazole to said ketone being within the range 1:20 to 20:1, and thereafter recovering by conventional means from the reaction mixture said chelate complex.

References Cited by the Examiner

Kostyanovskii, Doklady Akademic Nauk SSSR, vol. 139, pp. 877-879 (August 1961).

HENRY R. JILES, *Primary Examiner.*

R. J. GALLAGHER, *Assistant Examiner.*